United States Patent
Chen et al.

(10) Patent No.: US 10,776,271 B2
(45) Date of Patent: Sep. 15, 2020

(54) METHOD, DEVICE AND COMPUTER PROGRAM PRODUCT FOR VALIDATING CACHE FILE

(71) Applicant: EMC IP Holding Company LLC, Hopkinton, MA (US)

(72) Inventors: Wei Chen, Chengdu (CN); Yi Wang, Chengdu (CN); Qingxiao Zheng, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/284,596

(22) Filed: Feb. 25, 2019

(65) Prior Publication Data

US 2020/0133860 A1    Apr. 30, 2020

(30) Foreign Application Priority Data

Oct. 26, 2018  (CN) ........................... 2018 1 1261797

(51) Int. Cl.
*G06F 12/08* (2016.01)
*G06F 12/0815* (2016.01)

(52) U.S. Cl.
CPC .. *G06F 12/0815* (2013.01); *G06F 2212/1032* (2013.01)

(58) Field of Classification Search
CPC ......... G06F 12/0815; G06F 2212/1032; G06F 11/1464; G06F 11/1453; G06F 11/1466; G06F 11/1435
See application file for complete search history.

(56) References Cited

U.S. PATENT DOCUMENTS

| 6,101,585 A | * | 8/2000 | Brown | ................ G06F 11/1451 711/162 |
| 7,024,581 B1 | * | 4/2006 | Wang | ................. G06F 11/1417 713/2 |
| 7,814,074 B2 | * | 10/2010 | Anglin | ................ G06F 16/1756 707/692 |
| 8,484,427 B1 | * | 7/2013 | Goldobin | ............... G06F 3/065 711/161 |
| 9,152,353 B1 | * | 10/2015 | Wang | .................... G06F 3/0689 |
| 9,176,824 B1 | * | 11/2015 | Henriksen | ........... G06F 11/1464 |
| 9,367,559 B1 | * | 6/2016 | Zhang | ................. G06F 11/1451 |

(Continued)

OTHER PUBLICATIONS

N. Kaaniche and M. Laurent, "A Secure Client Side Deduplication Scheme in Cloud Storage Environments," 2014 6th International Conference on New Technologies, Mobility and Security (NTMS), Dubai, 2014, pp. 1-7. (Year: 2014).*

(Continued)

*Primary Examiner* — Khoa D Doan
(74) *Attorney, Agent, or Firm* — Chamberlain, Hrdlicka, White, Williams & Aughtry

(57) ABSTRACT

Embodiments of the present disclosure provide a method, device and computer program product for validating a cache file. In an embodiment, a reference cache file associated with the backed up data is divided into a plurality of reference segments. Reference check information is generated for the respective reference segments of the plurality of reference segments, and the generated reference check information is stored. In response to the initiating of a backup job, the stored reference check information is used to validate the cache file.

15 Claims, 6 Drawing Sheets

(56) References Cited

U.S. PATENT DOCUMENTS

| | | | |
|---|---|---|---|
| 10,025,673 B1* | 7/2018 | Maccanti | G06F 11/1466 |
| 10,185,504 B1* | 1/2019 | Pogosyan | G06F 3/067 |
| 10,387,265 B1* | 8/2019 | Pogosyan | G11C 7/1072 |
| 2004/0260973 A1* | 12/2004 | Michelman | G06F 11/1458 714/13 |
| 2005/0131990 A1* | 6/2005 | Jewell | G06F 11/1464 709/201 |
| 2006/0106838 A1* | 5/2006 | Ayediran | G06F 16/10 |
| 2010/0250858 A1* | 9/2010 | Cremelie | G06F 11/1453 711/136 |
| 2013/0166511 A1* | 6/2013 | Ghatty | G06F 16/21 707/649 |
| 2014/0101113 A1* | 4/2014 | Zhang | G06F 11/1453 707/692 |
| 2017/0220593 A1* | 8/2017 | Tripathy | G06F 16/1744 |

OTHER PUBLICATIONS

C. Pugh, T. Carrol and P. Henderson, "Ensuring high availability and recoverability of acquired data," 2011 IEEE/NPSS 24th Symposium on Fusion Engineering, Chicago, IL, 2011, pp. 1-5, doi: 10.1109/SOFE.2011.6052267. (Year: 2011).*

* cited by examiner

METHOD, DEVICE AND COMPUTER PROGRAM PRODUCT FOR VALIDATING CACHE FILE

FIELD

Embodiments of the present disclosure generally relate to computer technology, and more specifically, to a method, device and computer program product for validating a cache file.

BACKGROUND

During data backup, to reduce network traffic and server workload, a cache typically needs to be created to record data that is backed up. For example, a cache file may be created and stored at a backup client, in which the backed-up file data is recorded. When the backup client starts a backup job, the backup client may first check the cache file to find the backed-up file data. Because the cache file is stored locally at the client, the checking of the cache file can avoid a checking request to be sent to the backup server over a network, thereby reducing the network traffic. Meanwhile, the workload to find the existing file data may be avoided to be increased at the server.

The cache file may be created as an empty file initially. Therefore, for the first data backup, there will be no hit of the existing file data in the cache file. When a subsequent backup job starts, the new backup job may add information associated with the newly backed-up file data (such as a hash value) to the cache file. Thus, content of the cache file may be filled gradually.

Conventionally, if the cache file is corrupted, for example, a backed-up data section is not correctly recorded in the cache file, the cache file will be considered to be corrupted. Then, it is not possible to find the backed-up data. If the cache file is unavailable, the full data backup will be performed, which may take a long time. It may take ten times longer to complete the full data backup than the data backup using the cache file. This situation may often occur during the data backup, which influences user experience severely.

SUMMARY

In general, embodiments of the present disclosure provide a method, device and computer program product for validating a cache file.

In a first aspect, embodiments of the present disclosure provide a method of validating a cache file for recording data that is backed up. In this method, a reference cache file associated with the backed up data is segmented into a plurality of reference segments. Reference check information is generated for the respective reference segments of the plurality of reference segments, and the reference check information is stored. In response to data to be backed up, the cache file is validated by using the reference check information.

In a second aspect, embodiments of the present disclosure provide a device of validating a cache file for recording data that is backed up. The device comprises a processor and a memory comprising computer executable instructions stored thereon. The computer executable instructions, when executed by the processor, cause the device to perform acts comprising: segmenting a reference cache file associated with the backed up data into a plurality of reference segments, generating reference check information for the respective reference segments of the plurality of reference segments, storing the reference check information, and in response to data to be backed up, validating the cache file by using the reference check information.

In a third aspect, embodiments of the present disclosure provide a computer program product. The computer program product is tangibly stored on a non-transitory computer readable medium and comprises machine executable instructions. The machine executable instructions, when executed, cause a machine to perform the method according to the first aspect.

It is to be understood that the content described in the Summary is not intended to identify key features or essential features of the claimed subject matter, nor is it intended to be used to limit the scope of the claimed subject matter. Other features of the present disclosure will be more comprehensible with the following depiction.

BRIEF DESCRIPTION OF THE DRAWINGS

Through the following detailed description with reference to the accompanying drawings, the above and other features, advantages and aspects of embodiments of the present disclosure will become more apparent. In the drawings, the same or similar reference symbols refer to the same or similar elements, in which.

DETAILED DESCRIPTION OF EMBODIMENTS

Figure 1:
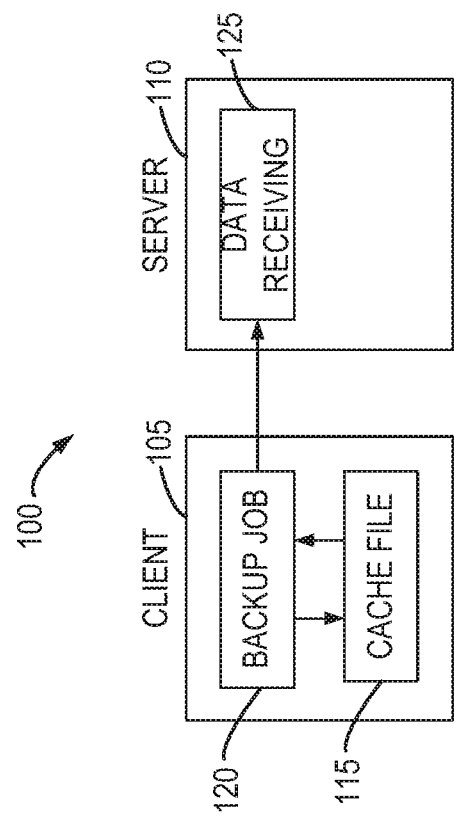
FIG. 1 illustrates an example backup system in which embodiments of the present disclosure may be implemented.

Embodiments of the present disclosure will be described in the following in more details with reference to the drawings. Although some embodiments of the present disclosure are illustrated in the drawings, it is to be understood that the present disclosure may be implemented in various manners and should not be limited to the embodiments illustrated herein. On the contrary, these embodiments are provided to make the present disclosure more thorough and complete. It is to be understood that the drawings of the present disclosure and embodiments thereof are only for the purpose of illustration without suggesting any limitation to the scope of protection of the present disclosure.

As used herein, the term "includes" and its variants are to be read as open-ended terms that mean "includes, but is not limited to". The term "based on" is to be read as "based at least in part on". The term "one embodiment" is to be read as "at least one embodiment"; the term "another embodiment" is to be read as "at least one another embodiment". The following text may also include relevant definitions of other terms.

During the data backup, a cache file may be created at the client to record the backed up data to reduce the network traffic and the server workload. Before the data is backed up, the client may determine which data has been backed up at the server by checking the cache file. For such data, the client may not have to perform the backup operation. As such, the network traffic and the server workload are reduced significantly. However, when the cache file is corrupted, the full data backup conventionally needs to be re-performed, which significantly increases the time of processing the backup job. In the case that the cache file is corrupted sometimes, the efficiency and performance of the backup is affected severely, thus influencing the user experience considerably.

Embodiments of the present disclosure provide a validating mechanism for a cache file. The mechanism divides a reference cache file into a plurality of reference segments in a predetermined segmentation mode, and generates the corresponding reference check information for the respective reference segments. For example, the reference cache file may be the latest cache file that is currently available. The reference check information generated for the respective reference segments is stored. When there is data to be backed up, the stored reference check information is utilized to validate the cache file.

According to embodiments of the present disclosure, the cache file may be segmented, and availability of the cache file may be checked segment by segment. Thus, when the cache file is corrupted, the corrupted part and uncorrupted part of the cache file may be found. In most cases, actually only a part of the cache file is corrupted. Therefore, the uncorrupted part of the cache file can still be used to avoid the full data backup to be performed frequently. In this way, the network traffic and the server workload can be reduced significantly, and the efficiency and performance of the backup can be improved considerably to improve the user experience.

FIG. 1 illustrates an example backup system 100 in which embodiments of the present disclosure may be implemented. The system 100 includes a client 105 and a server 110, which may be any suitable computing device. Examples of the computing device include, but are not limited to, a personal computer (PC), a laptop computer, a tablet computer, a personal digital assistant (PDA), a blade and the like. It is to be understood that one client and one server are shown in FIG. 1 only for the purpose of illustration. The system 100 may include any suitable number of clients and servers.

As shown, a cache file 115 is created and stored at the client 105. The cache file 115 is used for recording data that has already backed up at the server 110. When there is a new backup job (block 120), the client 105 may first check the cache file 115 to determine which data to be backed up has been backed up at the server 120. Then, the server 110 receives (block 125) the data that has not yet been backed up, from client 105 for data backup.

In various embodiments of the present disclosure, the client 105 divides the reference cache file associated with the backed up data into a plurality of reference segments and generates the corresponding reference check information for the respective reference segments. The client 105 stores the generated reference check information in a local storage device (not shown), for example. If there is data to be backed up, the client 105 uses the stored reference check information to validate the associated cache file.

Figure 2:
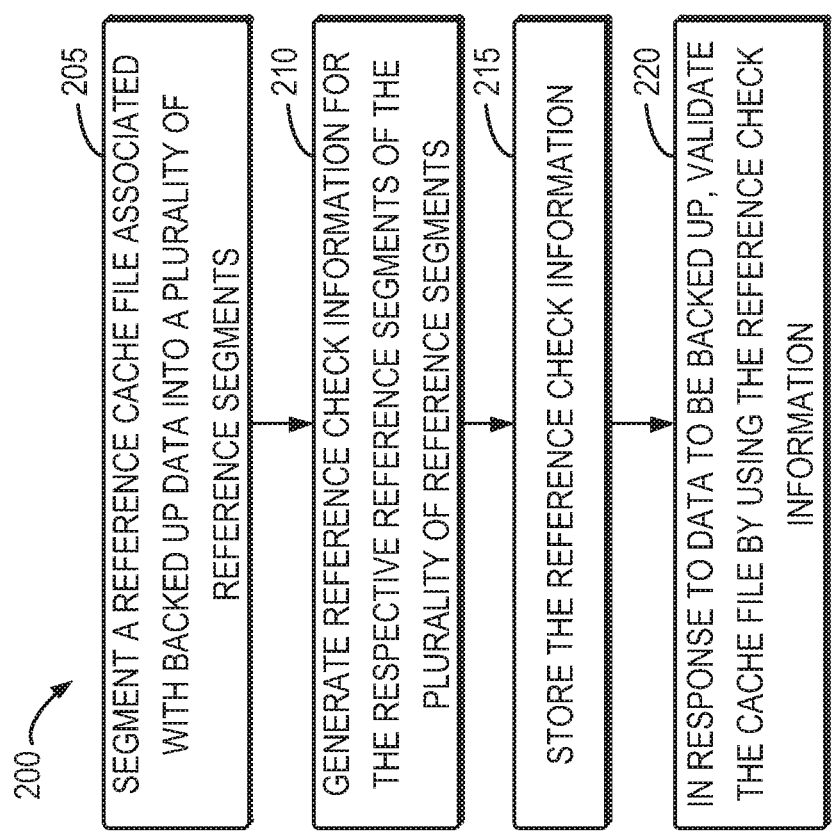
FIG. 2 is a flowchart illustrating a method in accordance with some embodiments of the present disclosure.

FIG. 2 illustrates a flowchart of an example method 200 for validating a cache file in accordance with some embodiments of the present disclosure. The method 200 can be implemented at the client 105 as shown in FIG. 1. For the purpose of discussion, the method 200 will be described below with reference to FIG. 1.

As shown in FIG. 2, at block 205, the reference cache file associated with the backed up data is divided at client 105 into a plurality of reference segments. As an example, the reference cache file may be the latest available cache file for recording the data that has been backed up at the server 110. The reference cache file may also be an available cache file that is updated upon certain data backup.

The reference cache file may be segmented in any suitable mode. In some embodiments, the reference cache file includes a file header and a plurality of elements. One of the elements may be a smallest data structure unit of the reference cache file, for example, for storing a hash value of the backed up data. In this case, the file header may be determined as one of the plurality of reference segments, and the plurality of elements are divided into the remaining reference segments of the plurality of reference segments.

The lengths of the plurality of reference segments may be the same. For example, when the plurality of elements in the reference cache file are divided into the plurality of reference segments, a reference number of elements to be included in each reference segment may be determined first, and the reference segments are then divided based on the determined reference number of the elements.

In the last segment, the number of the remaining elements may be smaller than the determined reference number. For example, assuming that the total number of the elements is M and the reference number of elements is N, then the number of elements in the last segment may be M mod N, namely, M % N. Alternatively, the number of the elements in the last segment may be greater than the determined reference number. For example, the last M % N elements may be grouped into one segment together with the immediately preceding N elements.

The lengths of the reference segments may be fixed. For example, the same number of elements may be grouped into one segment for different reference cache files that are segmented. Alternatively, the lengths of the reference segments may be variable dynamically. For example, the reference number of elements may be changed dynamically whenever a reference cache file is segmented.

After the reference cache file is segmented, at block 210, the reference check information for the reference segment is generated for the respective reference segments of the plurality of reference segments. As an example, the checksum of the information bits contained in each reference segment may be calculated as the corresponding reference check information. Other calculation approaches are also possible to generate the reference check information to validate the cache file.

At block 215, the client 105 stores the generated reference check information. For example, the client 105 may store the reference check information in the local storage device, or a storage device accessible to the client 105. In some embodiments, the reference check information may be stored in the form of a check file. The check file may be separated from the reference cache file and the cache file to be validated. The storing of the generated reference check information in a separate file may avoid modifying the cache file. Because the writing operation will not be performed on the cache file, generating and storing of check information will not impact the cache file, thereby increasing the reliability of both the check information and the cache file.

Figure 3:
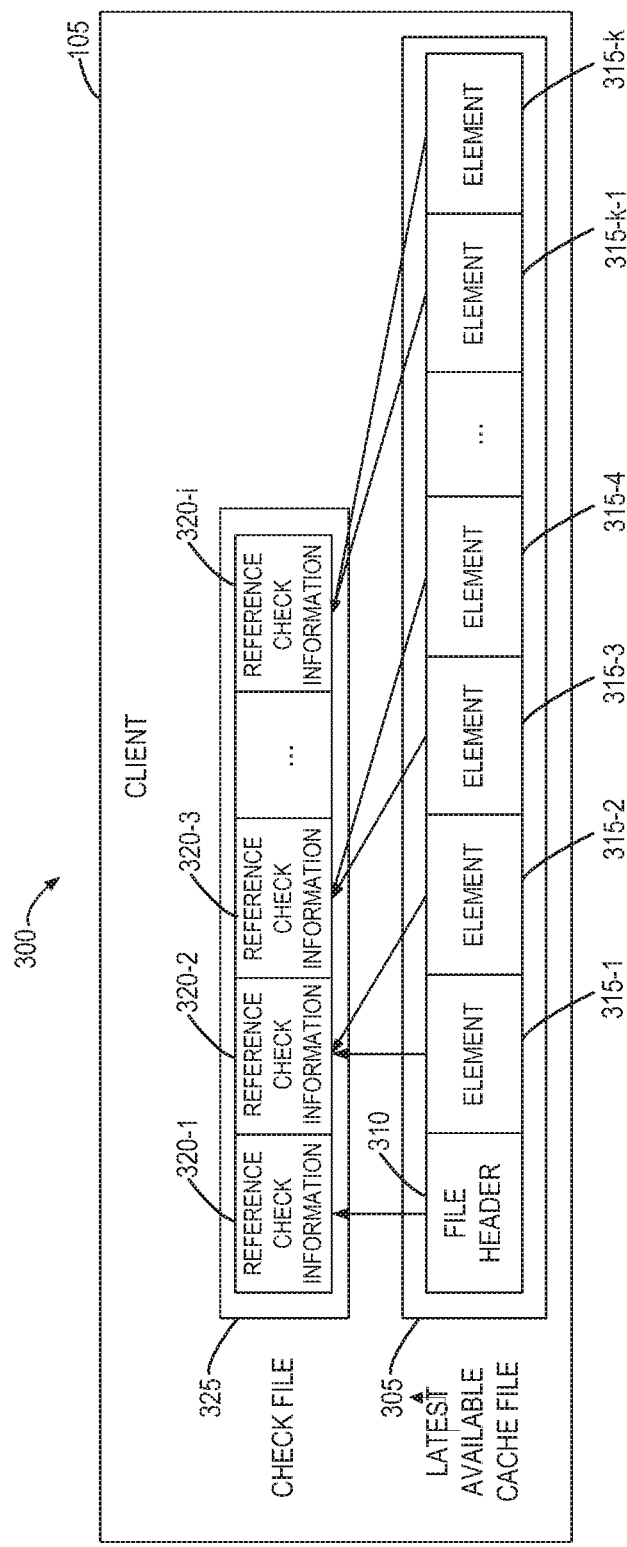
FIG. 3 illustrates an example process for processing a reference cache file in accordance with some embodiments of the present disclosure.

FIG. 3 illustrates an example process 300 for processing the reference cache file in accordance with some embodiments of the present disclosure. In this example, a reference cache file 305 is the latest available cache file for recording the backed up data.

As shown in FIG. 3, the reference cache file 305 includes a file header 310 and a plurality of elements 315-1, 315-2, 315-3, 315-4, . . . , 315-$k$–1 and 315-$k$ (collectively referred to as an element 315). The reference cache file 305 is divided into a plurality of segments, and the corresponding reference check information 320-1, 320-2, 320-3, . . . , 320-$i$ (collectively referred to as reference check information 320) is generated for each segment.

In this example, the file header 310 is determined to be a separate segment, and the corresponding reference check information 320-1 is generated. The elements 315 included in the reference cache file 305 are divided into a plurality of segments. When the elements 315 are segmented, a fixed number of elements 315 (such as each two elements 315) are grouped into a segment, and the reference check information 320-2, 320-3, . . . , 320-$i$ (collectively referred to as reference check information 320) is generated for each segment. The reference check information 320, for example, is a checksum of the information bits of the corresponding segment. The generated reference check information 320 is stored in a separate check file 325.

With reference to FIG. 2, at block 220, in response to data to be backed up, the stored reference check information is used to validate the cache file. In some embodiments, the cache file may be segmented and the corresponding check information may be generated in the modes to segment the reference cache file and generate the reference check information. For example, a segmentation mode of the reference cache file into the plurality of reference segments may be determined first as well as a generation mode of the corresponding reference check information. The cache file to be validated is then divided into a plurality of segments in the determined segmentation mode, and the check information of the respective segments is generated in the determined generation mode of the reference check information.

By comparing the generated check information and the stored corresponding reference check information segment by segment, it is validated which segment in the cache file is corrupted. For example, if the generated check information is the same as the stored reference check information, it may be determined that the segment is not corrupted. If the generated check information is different from the stored reference check information, it may be determined that the segment is corrupted. The corrupted segment may be identified as an invalid segment, and the uncorrupted segment may be identified as an available segment. The elements identified as invalid in the segment may be reinitialized to be empty elements. If new elements are to be added in the next backup, these empty elements may be used. For example, these empty elements may be used to record the data that is newly backed up.

In some embodiments, the validation of the cache file may be performed after the cache file has been determined to be corrupted. Thus, the validation of the cache file per segment may be performed when necessary, and thereby the efficiency of the data backup may be further improved.

Figure 4:
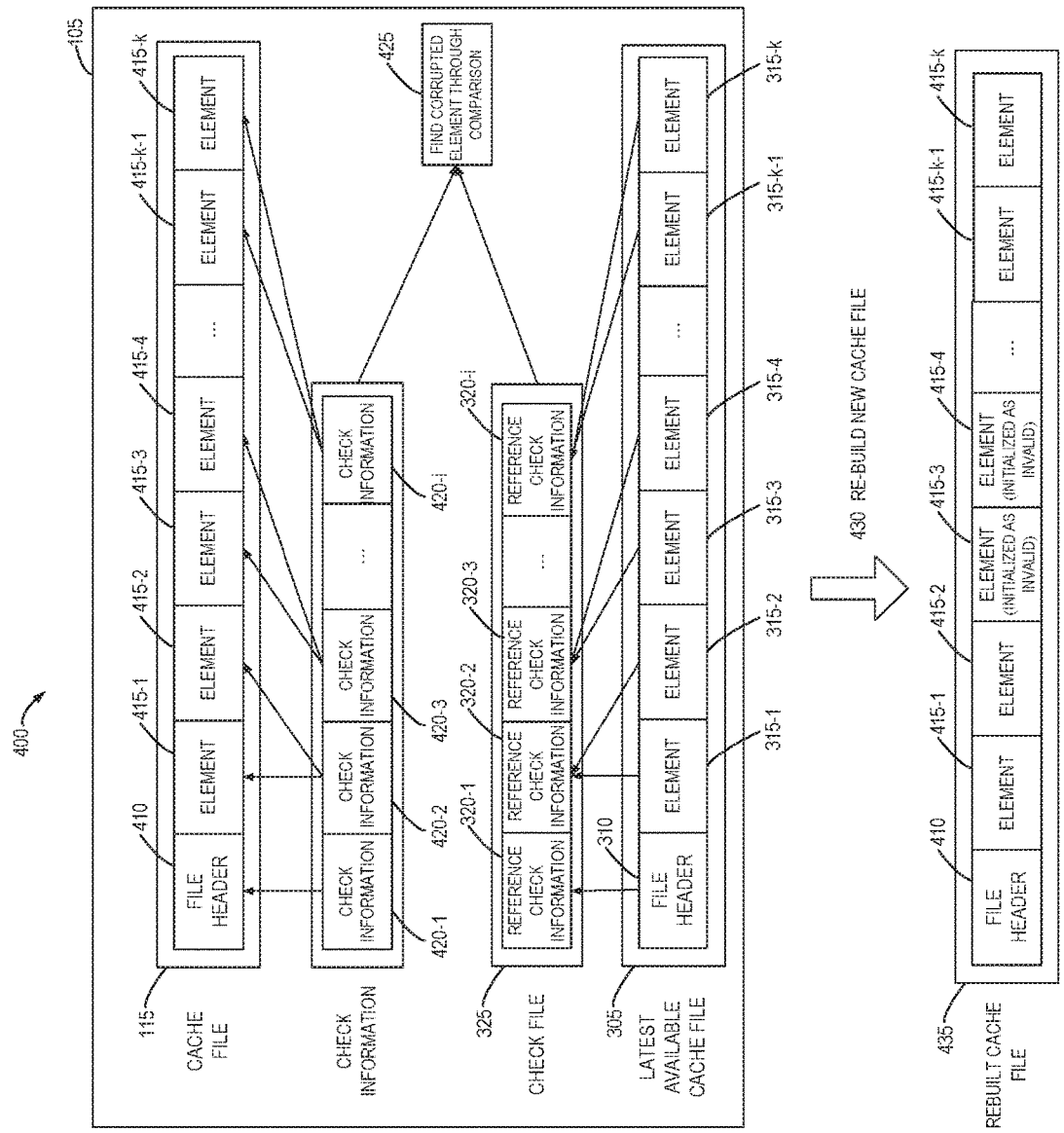
FIG. 4 illustrates an example process for validating a cache file in accordance with some embodiments of the present disclosure.

FIG. 4 illustrates an example process 400 for validating the cache file in accordance with some embodiments of the present disclosure. In this example, the reference cache file 305 is divided into a plurality of segments in the approach as shown in FIG. 3, and the check information 320 is generated for each segment. The check information 320 is stored in the separate check file 325.

As shown in FIG. 4, the cache file 115 includes a file header 410 and a plurality of elements 415-1, 415-2, 415-3, 415-4, . . . , 415-$k$–1 and 415-$k$ (collectively referred to as an element 415). Based on the same segmentation and generation modes as those for the reference cache file 305, the file header 410 in the cache file 405 is determined as one segment, and every two elements 415 are grouped in one segment. For each segment, the corresponding check information 420-1, 420-2, 420-3, . . . , 420-$i$ (collectively referred to as check information 420) is generated.

If the content in the file header 410 of the cache file 405 is incorrect, then the cache file 405 cannot be trusted. In this case, in some embodiments, the segment formed by the file header 410 may be processed specially to improve the reliability of the segment, thereby ensuring that the segment can have the higher reliability before a new cache file is rebuilt from the corrupted cache file, for example.

By comparing the generated check information 420 with the stored corresponding reference check information 320, it is found that elements 415-3 and 415-4 in the cache file 420 are corrupted (425). Then, a new cache file 435 is rebuilt (430). For example, the two elements 415-3 and 415-4 are identified to be invalid, for example, which are initialized as empty elements for use in the subsequent data backup.

Figure 5:
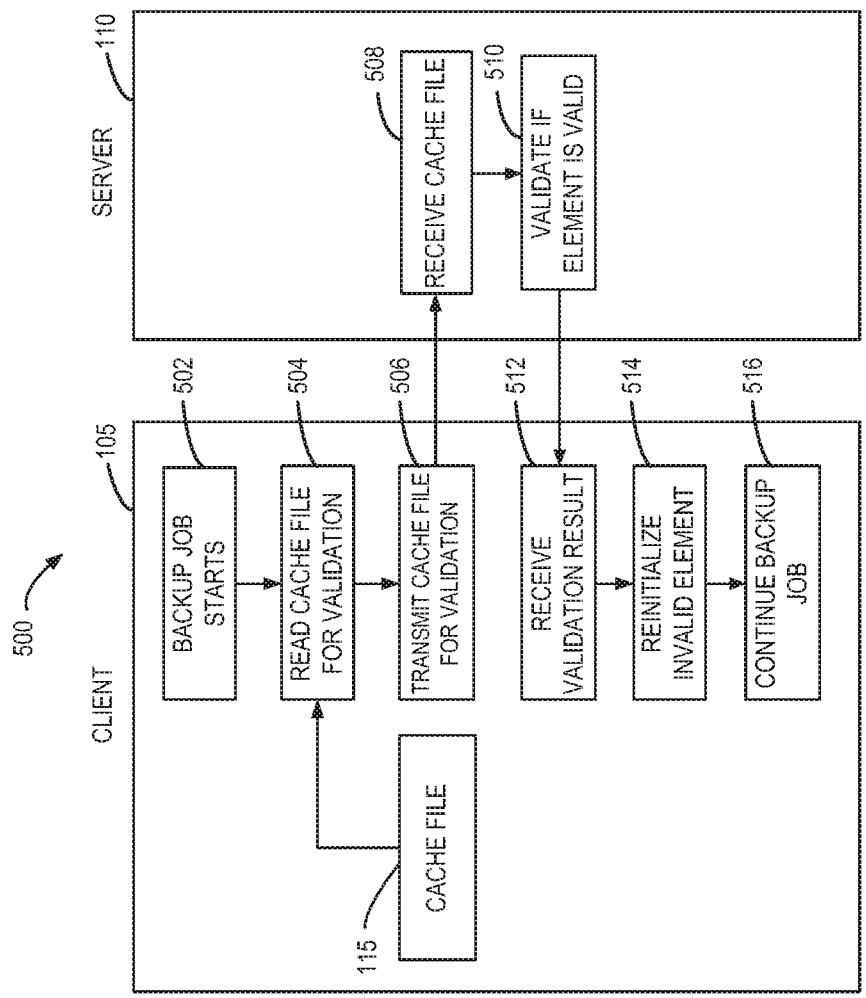
FIG. 5 illustrates an example process of data backup in accordance with some embodiments of the present disclosure.

FIG. 5 illustrates an example process 500 for data backup in accordance with some embodiments of the present disclosure. The process 500 can be implemented in the backup system 100 as shown in FIG. 1. For the purpose of discussion, the process 500 will be described below with reference to FIG. 1.

As shown in FIG. 5, at block 502, a backup job starts at the client 105. At block 504, the client 105 reads the cache file 115 to validate the cache file 115. All the operations and features of the validation per segment described above with reference to FIGS. 1 to 4 may be implemented at block 504, and the details will not be repeated.

After the cache file 115 is validated, at block 506, the client 105 transmits the cache file 115 to the server 110. The server 110 receives the cache file 115 at block 508 and then validates if each element in the cache file 115 is valid at block 510. At block 512, the server 110 transmits the validation result to the client 105. At block 514, the client 105 reinitializes the elements that are identified to be invalid. At block 516, the client 105 continues the backup job.

In this way, the availability of the content in the cache file 115 may be checked synchronously at the server 110. This allows the content of the new cache file rebuilt based on the corrupted cache file can be synchronized with that in the server, thereby ensuring the validity of the content in the new cache file. If it is found that an element does not exist by the validation at the server 110, the client 105 may update the cache file 115 and mark the corresponding data to be invalid. In the subsequent data backup, the client 105 may perform re-backup on the invalid data, thereby improving the efficiency and performance of the data backup.

In the conventional data backup based on the cache file, if it is detected that the cache file has been corrupted, then the cache file will not be used, and the full data backup will be triggered. The full backup usually takes a long time, which impacts the user experience severely. According to embodiments of the present disclosure, the cache file is divided into the segments, and the availability of the cache file is checked segment by segment. After the cache file is corrupted, some segments in the cache file can still be used, and there is no need to perform the full backup, thereby improving the backup performance significantly.

Figure 6:
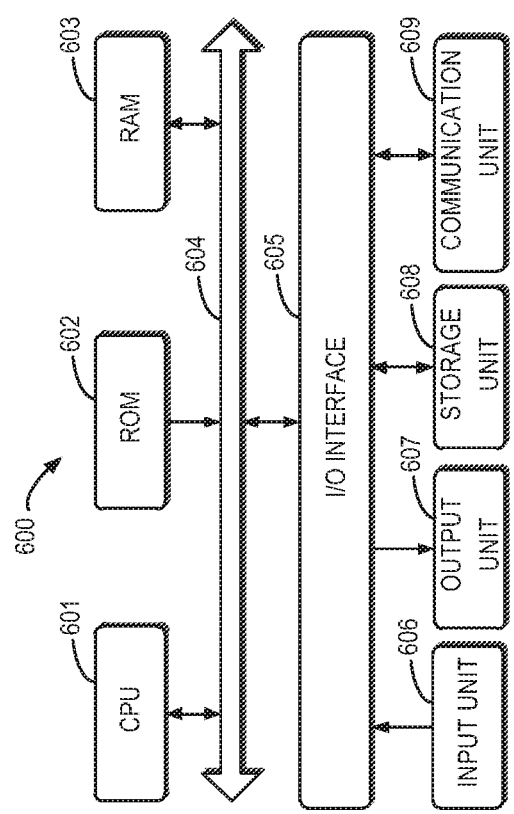
FIG. 6 illustrates a block diagram of a device suitable for implementing embodiments of the present disclosure.

FIG. 6 illustrates a schematic block diagram of a device 600 that may be used to implement embodiments of the present disclosure. As shown in FIG. 6, the device 600 includes a controller or a processor, or referred to as a central processing unit (CPU) 601 which can execute various appropriate actions and processing based on computer program instructions stored in a read-only memory (ROM) 602 and/or the computer program instructions loaded into a random access memory (RAM) 603. The ROM 602 and/or RAM 603 may store all kinds of programs and data required by operating the storage device 600. The CPU 601, ROM 602 and RAM 603 are connected to each other via a bus 604. Particularly, the device 600 may further include one or more dedicated processing units (not shown) which can be connected to a bus 604.

An input/output (I/O) interface 605 is also connected to the bus 604. A plurality of components in the device 600 are connected to the I/O interface 605, comprising: an input unit 606, such as a keyboard, a mouse and the like; an output unit 607, such as various types of displays, loudspeakers and the like; a storage unit 608, such as a magnetic disk, an optical disk and the like; and a communication unit 609, such as a network card, modem, a wireless communication transceiver and the like. The communication unit 609 allows the device 600 to exchange information/data with other devices through computer networks such as Internet and/or various telecommunication networks. In particular, in the embodiments of the present disclosure, the communication unit 609 supports communication with a client or other devices.

In some embodiments, the CPU 601 may be configured to perform various processes or processing described above, such as the method 200. For example, in some embodiments, the method 200 can be implemented as computer software programs, which are tangibly included in a machine-readable medium, such as the storage unit 608. In some embodiments, the computer program can be partially or completely loaded and/or installed to the device 600 via the ROM 602 and/or the communication unit 609. When the computer program is loaded to the RAM 603 and executed by the CPU 601, one or more steps of the above described method 200 are implemented. Alternatively, in other embodiments, the CPU 601 may also be configured to implement the above process/method in any other suitable manners.

Particularly, according to the embodiments of the present disclosure, the process described above with reference to FIGS. 1-5 may be implemented as a computer program product which may be tangibly stored on a non-transient computer readable storage medium and includes computer-executable instructions, the instructions, when executed, causing the device to implement various aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure. Aspects of the present disclosure are described herein with reference to flowchart and/or block diagrams of methods, apparatus (systems), and computer program products according to embodiments of the present disclosure. It is to be understood that each block of the block diagrams and/or flowchart illustrations, and combinations of blocks in the block diagrams and/or flowchart illustrations, can be implemented by computer readable program instructions.

The descriptions of the various embodiments of the present disclosure have been presented for illustration purposes, but are not intended to be exhaustive or limited to the embodiments disclosed. All modifications and variations shall fall under the scope of protection of the present disclosure defined by the claims without departing from the essence of the present disclosure.

The aspects of the present disclosure are described herein with reference to block diagrams and/or flowchart illustrations of devices, methods and computer program products according to embodiments of the present disclosure. It is to be understood that each block of the block diagrams and/or flowchart illustrations, and combinations of blocks in the block diagrams and/or flowchart illustrations, can be implemented by computer readable program instructions.

The descriptions of the various embodiments of the present disclosure have been presented for purposes of illustration, but are not intended to be limited to the embodiments disclosed. All the modifications and variations shall fall under the scope of protection of the present disclosure defined by the claims without departing from the essence of the present disclosure.

We claim:

1. A method of validating a cache file, comprising:
    segmenting a reference cache file associated with backed up data into a plurality of reference segments;
    generating reference check information for each of the plurality of reference segments;

storing the reference check information; and in response to initiating a backup job for data, validating the cache file by using the reference check information, wherein the data is associated with the backed up data, wherein validating the cache file comprises:

determining a segmentation mode of the plurality of reference segments and a generation mode of the reference check information;

dividing the cache file into a plurality of segments in the segmentation mode;

generating, for a segment of the plurality of segments, check information of the segment based on the generation mode of the reference check information; and validating the segment of the cache file by comparing the check information and the reference check information.

2. The method according to claim 1, wherein the reference cache file comprises a file header and a plurality of elements, and segmenting the reference cache file into the plurality of reference segments comprises:

determining the file header as one of the plurality of reference segments; and dividing the plurality of elements into remaining reference segments of the plurality of reference segments.

3. The method according to claim 2, wherein dividing the plurality of elements into the remaining reference segments of the plurality of reference segments comprises:

determining a reference number of elements to be included in each reference segment of the remaining reference segments; and dividing the plurality of elements into the remaining reference segments based on the reference number of elements.

4. The method according to claim 1, wherein storing the reference check information comprises:

storing the reference check information in a check file.

5. The method according to claim 1, wherein validating the segment of the cache file further comprises:

in response to the check information being different from the reference check information, identifying the segment as an invalid segment.

6. A device for validating a cache file, comprising:

a processor, and a memory comprising computer executable instructions stored thereon, the computer executable instructions, when executed by the processor, causing the device to perform a method, the method comprising:

segmenting a reference cache file associated with backed up data into a plurality of reference segments;

generating reference check information for each of the plurality of reference segments;

storing the reference check information; and in response to initiating a backup job for data, validating the cache file by using the reference check information, wherein the data is associated with the backed up data, wherein validating the cache file comprises:

determining a segmentation mode of the plurality of reference segments and a generation mode of the reference check information;

dividing the cache file into a plurality of segments in the segmentation mode;

generating, for a segment of the plurality of segments, check information of the segment based on the generation mode of the reference check information; and validating the segment of the cache file by comparing the check information and the reference check information.

7. The device according to claim 6, wherein the reference cache file comprises a file header and a plurality of elements, and segmenting the reference cache file into the plurality of reference segments comprises:

determining the file header as one of the plurality of reference segments; and dividing the plurality of elements into remaining reference segments of the plurality of reference segments.

8. The device according to claim 7, wherein dividing the plurality of elements into the remaining reference segments of the plurality of reference segments comprises:

determining a reference number of elements to be included in each reference segment of the remaining reference segments; and dividing the plurality of elements into the remaining reference segments based on the reference number of elements.

9. The device according to claim 6, wherein storing the reference check information comprises:

storing the reference check information in a check file.

10. The device according to claim 6, wherein validating the segment of the cache file further comprises:

in response to the check information being different from the reference check information, identifying the segment as an invalid segment.

11. A computer program product tangibly stored on a non-transient computer readable medium and comprising machine executable instructions which, when executed, cause a machine to perform a method for validating a cache file, the method comprising:

segmenting a reference cache file associated with backed up data into a plurality of reference segments;

generating reference check information for each of the plurality of reference segments;

storing the reference check information; and in response to initiating a backup job for data, validating the cache file by using the reference check information, wherein the data is associated with the backed up data, wherein validating the cache file comprises:

determining a segmentation mode of the plurality of reference segments and a generation mode of the reference check information;

dividing the cache file into a plurality of segments in the segmentation mode;

generating, for a segment of the plurality of segments, check information of the segment based on the generation mode of the reference check information; and validating the segment of the cache file by comparing the check information and the reference check information.

12. The computer program product according to claim 11, wherein the reference cache file comprises a file header and a plurality of elements, and segmenting the reference cache file into the plurality of reference segments comprises:

determining the file header as one of the plurality of reference segments; and dividing the plurality of elements into remaining reference segments of the plurality of reference segments.

13. The computer program product according to claim 12, wherein dividing the plurality of elements into the remaining reference segments of the plurality of reference segments comprises:
- determining a reference number of elements to be included in each reference segment of the remaining reference segments; and
- dividing the plurality of elements into the remaining reference segments based on the reference number of elements.

14. The computer program product according to claim 11, wherein storing the reference check information comprises:
- storing the reference check information in a check file.

15. The computer program product according to claim 11, wherein validating the segment of the cache file further comprises:
- in response to the check information being different from the reference check information, identifying the segment as an invalid segment.

* * * * *